(12) United States Patent
Czompo et al.

(10) Patent No.: US 9,151,613 B2
(45) Date of Patent: Oct. 6, 2015

(54) METHODS AND APPARATUS FOR DETECTING, MEASURING, AND MITIGATING EFFECTS OF MOVING AN INERTIAL NAVIGATION DEVICE'S CRADLE

(75) Inventors: Joseph Czompo, Santa Clara, CA (US); Jong Bin D. Lee, Pittsburgh, PA (US)

(73) Assignee: QUALCOMM Incorporated, San Diego, CA (US)

( * ) Notice: Subject to any disclaimer, the term of this patent is extended or adjusted under 35 U.S.C. 154(b) by 873 days.

(21) Appl. No.: 13/209,240

(22) Filed: Aug. 12, 2011

(65) Prior Publication Data

US 2013/0041585 A1  Feb. 14, 2013

(51) Int. Cl.
  *G01C 21/16* (2006.01)
  *G01C 21/00* (2006.01)
(52) U.S. Cl.
  CPC ............... *G01C 21/00* (2013.01); *G01C 21/16* (2013.01); *G01C 21/165* (2013.01)
(58) Field of Classification Search
  USPC ......................................................... 701/505
  See application file for complete search history.

(56) References Cited

U.S. PATENT DOCUMENTS

| | | | |
|---|---|---|---|
| 6,445,983 B1 * | 9/2002 | Dickson et al. ................ 701/23 |
| 7,162,367 B2 | 1/2007 | Lin et al. | |
| 8,155,874 B2 * | 4/2012 | Cho et al. ...................... 701/479 |
| 8,195,392 B2 * | 6/2012 | Watanabe et al. ............. 701/472 |
| 8,265,826 B2 * | 9/2012 | Feller et al. ..................... 701/41 |
| 8,457,882 B2 * | 6/2013 | Pyne et al. ..................... 701/418 |
| 8,510,044 B2 * | 8/2013 | Watanabe et al. ............. 701/472 |
| 8,892,385 B2 * | 11/2014 | Van den Bergh ............. 702/104 |
| 2001/0020216 A1 * | 9/2001 | Lin ................................ 701/216 |
| 2002/0019701 A1 * | 2/2002 | Miller ........................... 701/214 |
| 2004/0140405 A1 * | 7/2004 | Meyer ....................... 246/122 R |
| 2004/0172173 A1 * | 9/2004 | Goto et al. ........................ 701/1 |

(Continued)

FOREIGN PATENT DOCUMENTS

EP         2299241 A2     3/2011

OTHER PUBLICATIONS

Strap down inertial navigation system aiding with nonholonomic constraints using indirect Kalmar filtering Author: Joona Pusa Date-added = {Oct. 8, 2009 10:11:31 +0300}; Date-modified = {Oct. 8, 2009 10:23:47 +0300} Month = {Oct.} School = {Tampere University of Technology}.

(Continued)

*Primary Examiner* — Jonathan M Dager
(74) *Attorney, Agent, or Firm* — Muncy, Geissler, Olds & Lowe, P.C.

(57) ABSTRACT

Methods and apparatus for detecting, measuring, and/or mitigating effects of moving an inertial navigation device's cradle are provided. In an example, provided are methods and apparatus to mitigate cradle rotation-induced inertial navigation errors. In an example, a method for mitigating an inertial navigation error includes receiving inertial sensor data and processing the inertial sensor data with a first navigation algorithm having a non-holonomic constraint (NHC). A second navigation algorithm, lacking a NHC, also processes the inertial sensor data simultaneously with the first algorithm. A cradle rotation is detected by the second navigation algorithm. A first navigation algorithm result, produced from the inertial sensor data generated during the cradle rotation, is discarded. The first algorithm can be computationally realigned, based on a second navigation algorithm result produced from the inertial sensor data generated during the cradle rotation.

29 Claims, 4 Drawing Sheets

(56) References Cited

U.S. PATENT DOCUMENTS

| | | | |
|---|---|---|---|
| 2005/0114023 A1* | 5/2005 | Williamson et al. | 701/214 |
| 2005/0137799 A1* | 6/2005 | Alban et al. | 701/213 |
| 2007/0219720 A1* | 9/2007 | Trepagnier et al. | 701/300 |
| 2007/0260398 A1* | 11/2007 | Stelpstra | 701/213 |
| 2008/0091351 A1* | 4/2008 | Hoshizaki | 701/214 |
| 2008/0114545 A1 | 5/2008 | Takaoka et al. | |
| 2008/0208501 A1* | 8/2008 | Fiedler et al. | 702/95 |
| 2009/0030608 A1* | 1/2009 | Soehren et al. | 701/213 |
| 2009/0254278 A1* | 10/2009 | Wang | 701/216 |
| 2009/0254279 A1* | 10/2009 | Han et al. | 701/221 |
| 2009/0271109 A1 | 10/2009 | Lee et al. | |
| 2010/0019963 A1* | 1/2010 | Gao et al. | 342/357.04 |
| 2010/0106356 A1* | 4/2010 | Trepagnier et al. | 701/25 |
| 2010/0198511 A1* | 8/2010 | Hunter et al. | 701/216 |
| 2011/0125404 A1* | 5/2011 | Czompo | 701/216 |
| 2011/0184644 A1* | 7/2011 | McBurney et al. | 701/208 |
| 2011/0238307 A1* | 9/2011 | Psiaki et al. | 701/213 |
| 2011/0291887 A1* | 12/2011 | Pulford | 342/357.58 |
| 2011/0313650 A1* | 12/2011 | Tome | 701/200 |
| 2012/0022780 A1* | 1/2012 | Kulik et al. | 701/220 |
| 2012/0065883 A1* | 3/2012 | Williamson | 701/501 |
| 2012/0173195 A1* | 7/2012 | Opshaug et al. | 702/151 |
| 2012/0176492 A1* | 7/2012 | Garin | 348/116 |
| 2012/0221244 A1* | 8/2012 | Georgy et al. | 701/472 |
| 2012/0245839 A1* | 9/2012 | Syed et al. | 701/408 |
| 2014/0288825 A1* | 9/2014 | Czompo et al. | 701/518 |
| 2015/0084812 A1* | 3/2015 | Sernik | 342/357.43 |

OTHER PUBLICATIONS

International Search Report and Written Opinion—PCT/US2012/049157—ISA/EPO—Nov. 7, 2012.

* cited by examiner

METHODS AND APPARATUS FOR DETECTING, MEASURING, AND MITIGATING EFFECTS OF MOVING AN INERTIAL NAVIGATION DEVICE'S CRADLE

FIELD OF DISCLOSURE

This disclosure relates generally to electronics, and more specifically, but not exclusively, to apparatus and methods for detecting, measuring, and/or mitigating effects of moving an inertial navigation device's cradle.

BACKGROUND

Conventional cradle-mounted navigation devices having an inertial navigation system (INS) become disoriented when the navigation device is moved relative to the vehicle to which the cradle is mounted, if the navigation device uses its fixed orientation with respect to the vehicle as a constraint. The constraint is usually applied to enhance the navigation solution. When the cradle is rotated and/or moved relative to the vehicle, a mathematical alignment of the INS to the vehicle coordinate system breaks, resulting in an incorrect navigation solution. For example, a passenger may rotate a cradle holding the navigation device to view the device's screen, thus changing the device's position and orientation relative to the vehicle. The navigation device's INS improperly measures the passenger's movement of the navigation device as a differential movement of the vehicle. Moving the cradle induces gross errors into the conventional navigation device's calculations.

In other words, to provide good navigation results, the conventional navigation device that is cradle-mounted in a vehicle needs to be mathematically aligned to the vehicle coordinate system in order to take advantage of an algorithm accounting for a non-holonomic constraint (NHC). An NHC causes a state of an object to depend on a path taken by that object in achieving the state. The NHC prevents movement in at least one direction, and the NHC exists when a number of degrees of freedom in a path exceeds the number of independent motions that the object taking the path can produce. For example, a bicycle cannot be pedaled sideways from a first location directly to a second location that is parallel with the first location. The constraint that the bicycle cannot be peddled sideways, even though the rider must move to the second location, is an NHC. It is noteworthy that the NHC limits a direction in which the object can move, but does not limit the locations to which the object can move. Continuing with the example above, the NHC does not prevent the bicycle rider from moving to the second location, because the bicycle can be pedaled in a circular direction into the second location.

Accordingly, there are long-felt industry needs for methods and apparatus that mitigate the shortcomings of conventional methods and apparatus, including an apparatus and method for detecting and measuring cradle movement, as well as an apparatus and method for mitigating inertial navigation errors induced by cradle movement.

SUMMARY

This summary provides an basic understanding of some aspects of the present teachings. This summary is not exhaustive in detail, and is neither intended to identify all critical features, nor intended to limit the scope of the claims.

In examples, provided are methods and apparatus for detecting, measuring, and mitigating effects of moving an inertial navigation device's cradle. For example, a method for mitigating an inertial navigation error is provided. The method includes receiving inertial sensor data, processing the inertial sensor data with a first navigation algorithm having a non-holonomic constraint (NHC), and processing the inertial sensor data with a second navigation algorithm lacking an NHC. The first and second navigation algorithms are executed simultaneously. Further, the method includes detecting a cradle rotation with the second navigation algorithm and discarding a first navigation algorithm result produced from the inertial position data generated during the cradle rotation. The method can also include outputting a second navigation algorithm result produced from the inertial sensor data generated during the cradle rotation. The method can also include computationally realigning the first algorithm based on a second navigation algorithm result produced from the inertial sensor data generated during the cradle rotation. The computational alignment of the first algorithm can include realigning the first algorithm in one step after the cradle rotation is completed (i.e., batch processing instead of continuous processing). In an example, the inertial sensor data is gyroscope output data. In an example, the inertial sensor data is accelerometer output data.

In a further example, provided is a non-transitory computer-readable medium, comprising instructions stored thereon that, if executed by a processor and/or other hardware described herein, cause the processor to execute and/or control execution of at least a part of the methods described herein. The non-transitory computer-readable medium can be integrated with at least one of a mobile device, navigation device, communications device, personal digital assistant (PDA), and a computer.

In another example, provided is an apparatus configured to mitigate an inertial navigation error. The apparatus includes means for receiving inertial sensor data, means for processing the inertial sensor data with a first navigation algorithm having a non-holonomic constraint (NHC), and means for processing the inertial sensor data with a second navigation algorithm lacking an NHC. The first and second navigation algorithms are executed simultaneously. The apparatus also includes means for detecting a cradle rotation with the second navigation algorithm and means for discarding a first navigation algorithm result produced from the inertial sensor data generated during the cradle rotation. The apparatus can further comprise means for outputting a second navigation algorithm result produced from the inertial sensor data generated during the cradle rotation. The apparatus can further comprise means for computationally realigning the first algorithm based on a second navigation algorithm result produced from the inertial sensor data generated during the cradle rotation. The means for computationally realigning can include realigning the first algorithm in one step after the cradle rotation is completed (i.e., batch processing instead of continuous processing). In an example, the inertial sensor data is gyroscope output data. In an example, the inertial sensor data is accelerometer output data. In an example, at least a part of the apparatus is integrated on a semiconductor die. In a further example, the apparatus can be integrated with at least one of a mobile device, a navigation device, communications device, personal digital assistant (PDA), and a computer. In a further example, provided is a non-transitory computer-readable medium, comprising instructions stored thereon that, if executed by a lithographic device, cause the lithographic device to fabricate at least a part of the apparatus.

Also provided in an example is an apparatus configured to mitigate an inertial navigation error. The apparatus includes a processor and/or other hardware described herein that is configured to receive inertial sensor data, process the inertial sensor data with a first navigation algorithm having a non-holonomic constraint (NHC), and process the inertial sensor data with a second navigation algorithm lacking an NHC. The first and second navigation algorithms are executed simultaneously. The processor is also configured to detect a cradle rotation with the second navigation algorithm and discard a first navigation algorithm result produced from the inertial sensor data generated during the cradle rotation. The processor can be further configured to output a second navigation algorithm result produced from the inertial sensor data generated during the cradle rotation. The processor can be further configured to computationally realign the first algorithm based on a second navigation algorithm result produced from the inertial sensor data generated during the cradle rotation. The processor can be further configured to computationally realign the first algorithm in one step after the cradle rotation is completed (i.e., batch processing instead of continuous processing). In an example, the inertial sensor data is accelerometer output data. In an example, at least a part of the processor is integrated on a semiconductor die. In a further example, the processor can be integrated with at least one of a mobile device, a navigation device, communications device, personal digital assistant (PDA), and a computer. In a further example, provided is a non-transitory computer-readable medium, comprising instructions stored thereon that, if executed by a lithographic device, cause the lithographic device to fabricate at least a part of the apparatus.

The foregoing has broadly outlined some of the features and technical advantages of the present teachings in order that the detailed description that follows may be better understood. Additional features and advantages are also described. The conception and disclosed embodiments can be readily utilized as a basis for modifying or designing other structures for carrying out the same purposes of the present teachings. Such equivalent constructions do not depart from the technology of the teachings as set forth in the appended claims. The novel features which are characteristic of the teachings, together with further objects and advantages, are better understood from the detailed description and the accompanying figures. Each of the figures is provided for the purpose of illustration and description only, and does not define limits of the present teachings.

BRIEF DESCRIPTION OF THE DRAWINGS

The accompanying drawings are presented to describe examples of the present teachings, and are not provided as limitations.

Figure 1:
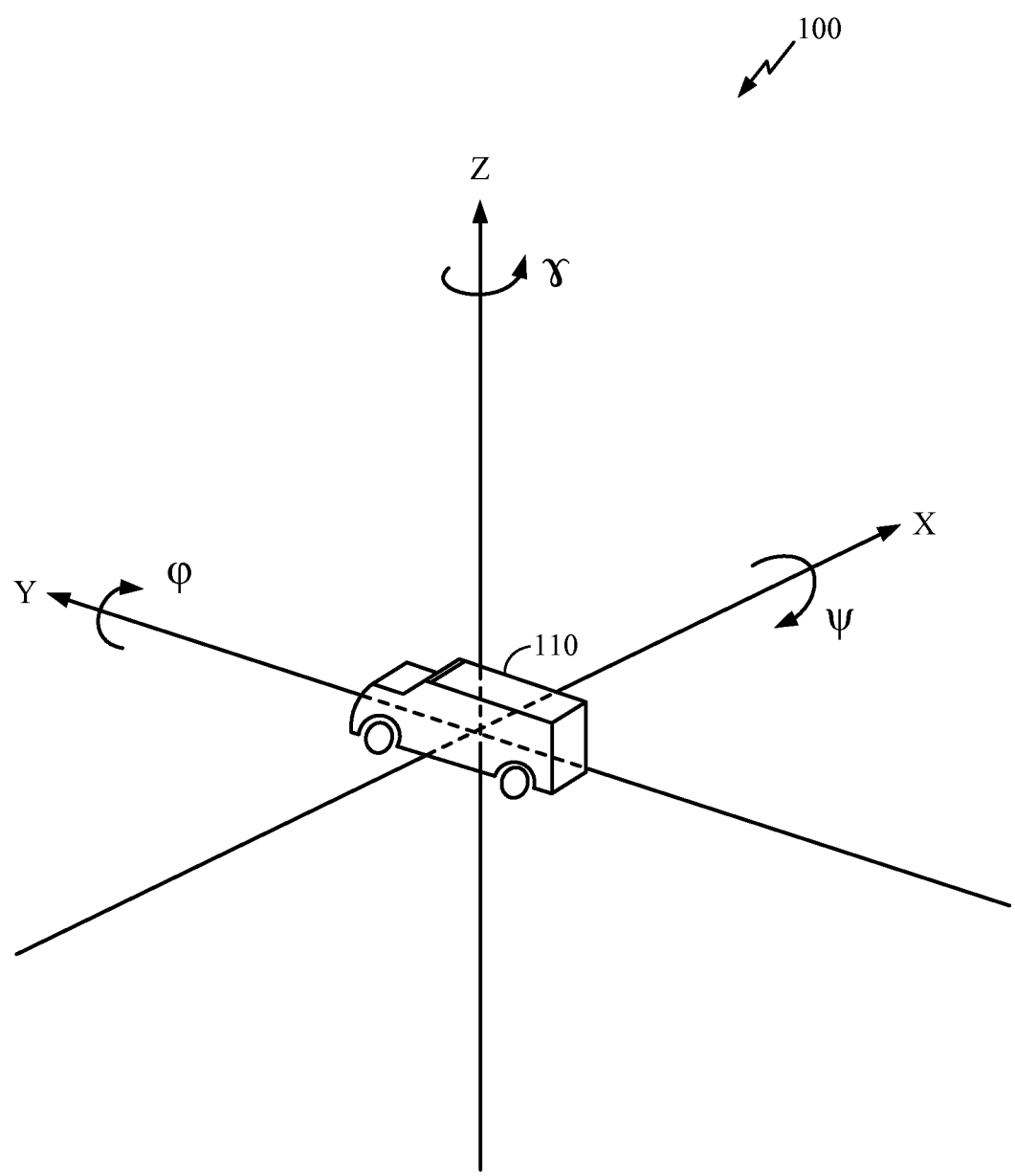
FIG. 1 depicts an exemplary vehicle coordinate system.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

Examples of the current teachings are disclosed in this application's text and related drawings. The examples advantageously address the long-felt industry needs, as well as other previously unidentified needs, and mitigate shortcomings of the conventional methods and apparatus. Alternate embodiments may be devised without departing from the scope of the invention. Additionally, conventional elements of the current teachings may not be described in detail, or may be omitted, to avoid obscuring aspects of the current teachings.

The word "exemplary" is used herein to mean "serving as an example, instance, or illustration." Any embodiment described as "exemplary" is not necessarily to be construed as preferred or advantageous over other embodiments. Likewise, the term "embodiments of the invention" does not require that all embodiments of the invention include the discussed feature, advantage or mode of operation. Use of the terms "in one example," "an example," "in one feature," and/or "a feature" in this specification does not necessarily refer to the same feature and/or example. Furthermore, a particular feature and/or structure can be combined with one or more other features and/or structures.

It should be understood that any reference to an element herein using a designation such as "first," "second," and so forth does not generally limit the quantity or order of those elements. Rather, these designations can be used herein as a convenient method of distinguishing between two or more elements or instances of an element. Thus, a reference to first and second elements does not mean that only two elements can be employed, or that the first element must precede the second element. Also, unless stated otherwise a set of elements can comprise one or more elements. In addition, terminology of the form "at least one of: A, B, or C" used in the description or the claims means "A or B or C or any combination of these elements."

The terminology used herein is for the purpose of describing particular embodiments only and is not intended to be limiting of embodiments of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should be noted that the terms "connected," "coupled," or any variant thereof, mean any connection or coupling, either direct or indirect, between two or more elements, and can encompass the presence of one or more intermediate elements between two elements that are "connected" or "coupled" together. The coupling or connection between the elements can be physical, logical, or a combination thereof. As employed herein two elements can be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

It should be understood that the term "signal" can include any signal such as a data signal, audio signal, video signal, multimedia signal. Information and signals can be represented using any of a variety of different technologies and techniques. For example, data, instructions, commands, information, signals, bits, symbols, and chips that can be referenced throughout this description can be represented by voltages, currents, electromagnetic waves, magnetic fields or particles, optical fields or particles, or any combination thereof.

In this description, certain terminology is used to describe certain features. The term "mobile device" includes, but is not limited to, a human-portable navigation device, a vehicle-portable navigation device, a mobile phone, a mobile communication device, a personal digital assistant, a mobile hand-held computer, a wireless device, a GPS-enabled device, a music player, a video player, an entertainment unit, and/or a device typically carried by individuals and having some form of navigation capabilities.

Methods and apparatus for detecting, measuring, and/or mitigating effects of moving (e.g., rotating) an inertial navigation device's cradle are provided. Two navigation algorithms, one accounting for a non-holonomic constraint (NHC), and one that does not account for an NHC, simultaneously process inertial sensor data from a motion sensor. A cradle movement is detected by the navigation algorithm not having the NHC, which triggers discarding a navigation algorithm result, produced by the navigation algorithm having the NHC, from the inertial sensor data generated during the cradle movement. Then, the algorithm having the NHC can be recalibrated based on a result from the algorithm without the NHC that is produced from the inertial position data generated during the cradle movement.

An advantage provided by the exemplary apparatuses and methods disclosed herein is an improvement in accuracy over conventional INS-based navigation devices. Another advantage is that the exemplary apparatuses and methods disclosed herein make the INS-based navigation device easier to use by freeing a user from a constraint of having to rigidly affix the INS-based device to a vehicle, thus enabling portable INS-devices with reduced errors (compared to conventional devices), which greatly increases usability, improves user satisfaction, and serves realistic user expectations.

FIG. 1 depicts an exemplary vehicle coordinate system 100 of a vehicle 110. The vehicle coordinate system 100 is a three-axis Cartesian coordinate space that describes lateral movement of the vehicle 110 in the directions X, Y, and Z. The vehicle coordinate system 100 also describes rotational movement of the vehicle 110. Yaw of the vehicle 110 (related to azimuth or heading) is indicated by gamma ($\gamma$), pitch is indicated by psi ($\psi$), and roll is indicated by phi ($\phi$). The vehicle coordinate system 100 is rigidly attached to the vehicle 110, but can be oriented relative to the earth by suitable means.

Figure 2:
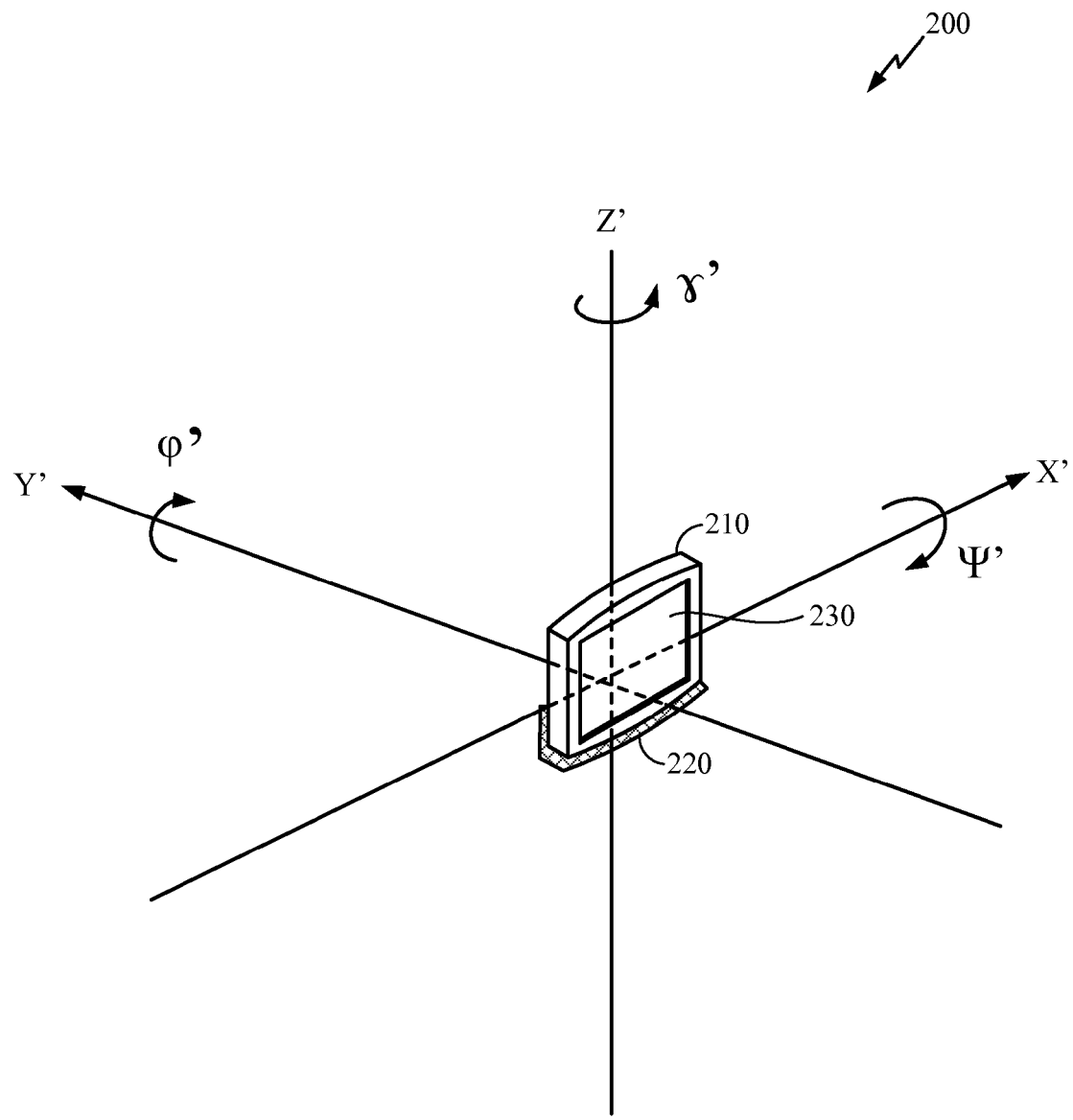
FIG. 2 depicts an exemplary inertial navigation system coordinate system.

FIG. 2 depicts an exemplary inertial navigation system coordinate system 200 of a navigation device 210 having an inertial navigation system. The inertial navigation system coordinate system 200 is a three-axis Cartesian coordinate space that describes lateral movement of the navigation device 210 in the directions X', Y', and Z'. The inertial navigation system coordinate system 200 also describes rotational movement of the navigation device 210. Yaw of the navigation device 210 is indicated by gamma prime ($\gamma'$), pitch is indicated by psi prime ($\psi'$), and roll is indicated by phi prime ($\phi'$). The navigation system coordinate system 200 is rigidly attached to the navigation device 210, but can be oriented relative to the earth or the vehicle coordinate systems.

The navigation device 210 can use a gyroscope as a motion sensor to measure rotation about the X', Y', and Z' coordinates. In particular implementations, the gyroscope can detect motion and produce information indicative of angular movement about one, two, or three axes of the gyroscope. An accelerometer is another type of motion sensor that can be used by the navigation device 210 to measure the linear acceleration along the X', Y', and Z' coordinate axes. Some applications can employ more than one measurement from at least one motion sensor, and can employ multiple degrees (axes) of observability from a motion sensor. Further, different applications can employ different combinations of motion sensors.

The inertial navigation system coordinate system 200 can be mathematically aligned (i.e., calibrated) to the vehicle coordinate system 100, by the navigation device 210, in order for the navigation device 210 to accurately measure movement of the vehicle 110. The mathematical alignment obviates a need to mechanically align the navigation device 210 with the vehicle 110. When the inertial navigation system coordinate system 200 is mathematically aligned to the vehicle coordinate system 100, the relationship between the X, Y and Z axes with respect to the X', Y' and Z' axes is known as a mathematical rotation. To maintain the mathematical alignment, the navigation device 210 can be docked in a cradle 220 that is mounted to the vehicle 110.

The cradle 220 can hold the navigation device 210 temporarily or permanently. Types of cradles include port replicators and docking stations. The mechanical connection between the cradle 220 and the vehicle 110 can be flexible (i.e., adjustable), so that a user of the navigation device 210 can orient a screen 230 of the navigation device 210 for optimal viewing. The cradle 220 can also electrically couple the navigation device 210 to other circuits in the vehicle 110, such as a sensor (e.g., a vehicle speed sensor, a steering position sensor, a temperature sensor, a ranging position sensor, etc.), an automotive computer, and/or a power supply.

Figure 3:
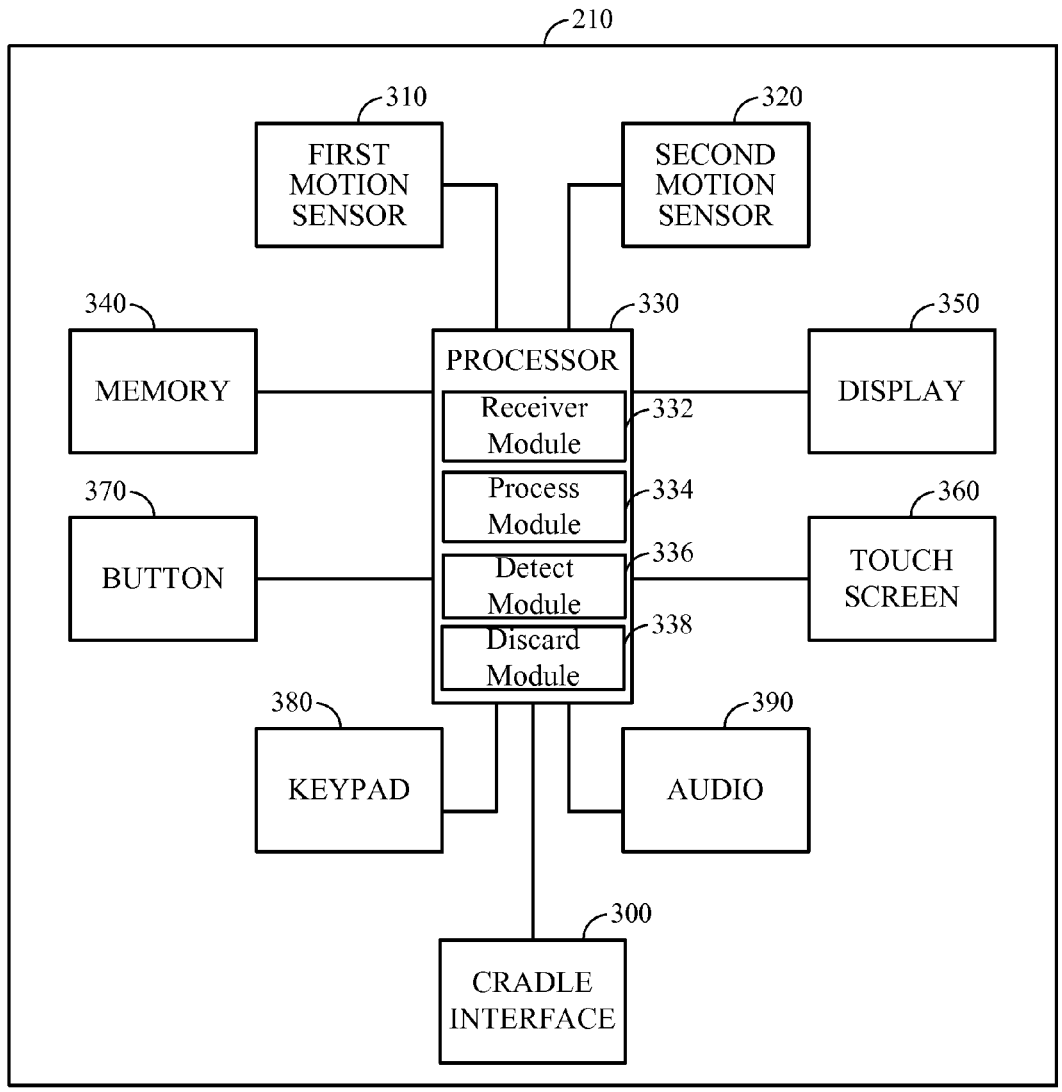
FIG. 3 depicts an exemplary schematic of a navigation device having an inertial navigation system.

FIG. 3 depicts an exemplary schematic of the navigation device 210, which is a mobile device. The navigation device 210 can include a cradle interface 300 for electrically interfacing the navigation device 210 to the cradle 220. The navigation device 210 can also include a first motion sensor 310, a second motion sensor 320, a processor 330, a memory 340, and a display 350. The first motion sensor 310 can include an accelerometer, and the second motion sensor 320 can comprise a gyroscope. The accelerometer provides an accelerometer output to the processor 330, and the gyroscope provides a gyroscope output to the processor 330. Although only two motion sensors are shown in FIG. 3, it should be appreciated that additional, or fewer, motion sensors can be used. Further, a single motion sensor (e.g., the first motion sensor 310) can be configured to measure both linear and angular motion. The navigation device 210 also includes devices and circuitry to accept user input, such as a touch screen 360, a button 370, a keypad 380, and/or an audio device 390 (e.g., a microphone). Further, the navigation device 210 also includes devices and circuitry to provide output data, such as the display 350 and/or the audio device 390 (e.g., a speaker). In an example, the processor 330 can be integrated on a semiconductor die.

One embodiment can include an apparatus configured to mitigate an inertial navigation error, which can include a processor configured with various program modules to perform the functions discussed herein. For example, the processor can include a receiver module 332 configured to receive inertial sensor data. A process module 334 can be configured to process the inertial sensor data with a first navigation algorithm having a non-holonomic constraint (NHC) and to process the inertial sensor data with a second navigation algorithm lacking a NHC. The first and second navigation algorithms can be executed simultaneously. A detect module 336 can be configured to detect a cradle rotation with the second navigation algorithm. Finally, a discard module 338 can be configured to discard a first navigation algorithm result produced from the inertial sensor data generated during the cradle rotation. It will be appreciated that the modules (332, 334, 336, 338) each may be configured as one or more integrated circuits, program instructions being executed by one or more processors (e.g., processor 330 as illustrated), or by a combination of both to perform the functionalities described herein.

In an example, the processor 330 is configured to perform a method for detecting, measuring, and/or mitigating effects of moving the cradle 220, such as the method described below in FIG. 4. Without using an algorithm having an NHC, the navigation device 210 outputs vehicle heading information even if the navigation device 210 is being rotated with respect to the heading. The processor 330 runs two algorithms simultaneously: one with an NHC, and one without an NHC. Normally the algorithm having the NHC is used for navigation, since it provides better (i.e., more accurate) results. However, when the algorithm without the NHC detects cradle rotation, the navigation results from the algorithm without the NHC are used during the cradle rotation, and the results from the algorithm having the NHC are discarded since the algorithm having the NHC provides erroneous results during cradle rotation. The navigation device 210 is then mathematically (not mechanically) realigned to the vehicle 110, and navigation can continue based on the algorithm with the NHC, until the next cradle rotation is detected. The mathematical realignment can be performed after the cradle rotation has stopped. In examples, the mathematical realignment can be performed with a continuous process or a batch process. Since the NHC-free navigation solution is used only momentarily, it is sufficiently accurate to substitute the results from the algorithm having the NHC at the time of cradle rotation.

Figure 4:
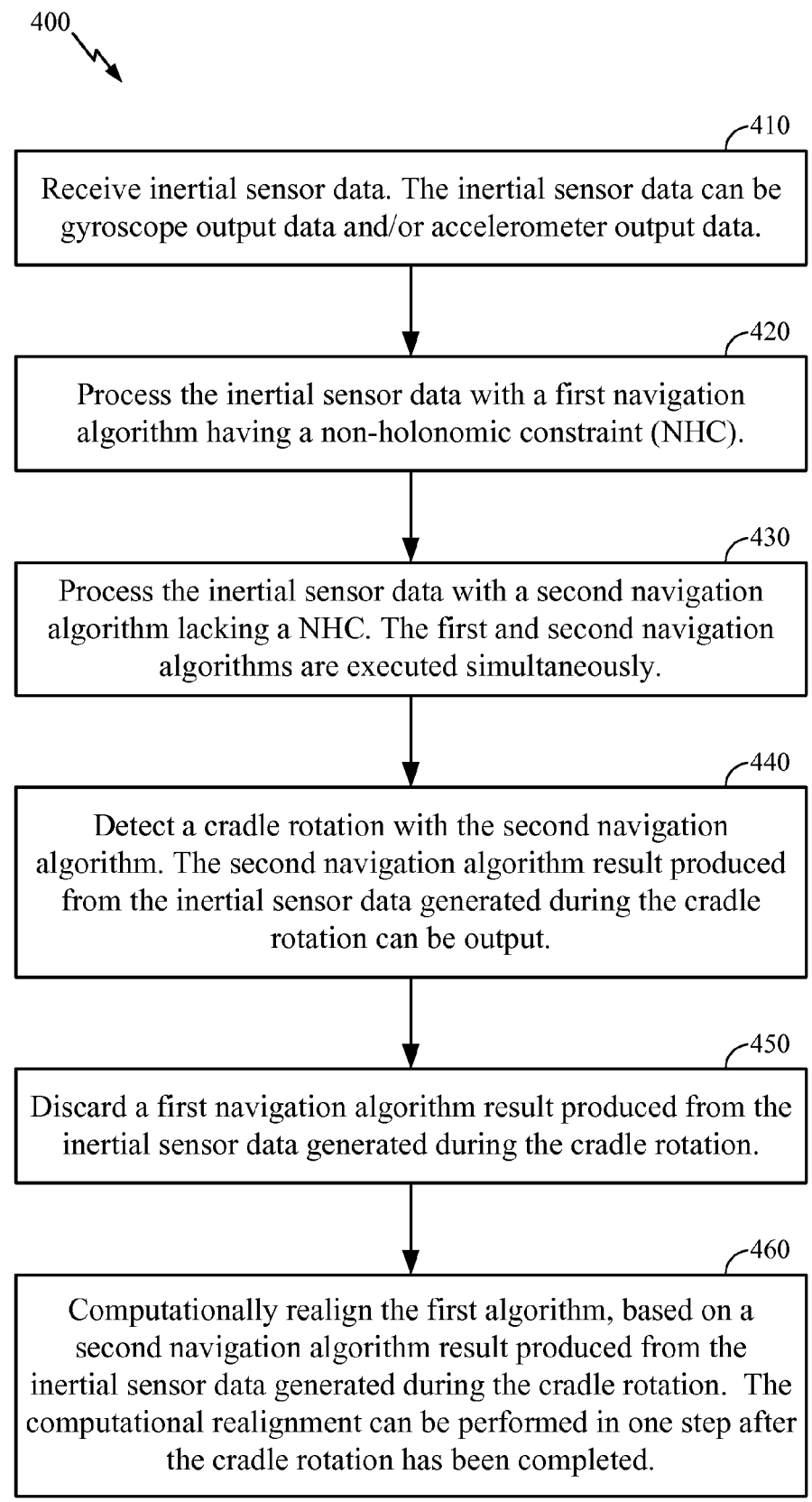
FIG. 4 depicts an exemplary method for mitigating an inertial navigation error.

FIG. 4 depicts an exemplary method for mitigating an inertial navigation error 400. The method for mitigating an inertial navigation error 400 can be performed by the apparatus described hereby, such as the navigation device 210.

In step 410, inertial sensor data is received. The inertial sensor data can be gyroscope output data and/or accelerometer output data.

In step 420, the inertial sensor data is processed with a first navigation algorithm having a non-holonomic constraint (NHC).

In step 430, the inertial sensor data is processed with a second navigation algorithm lacking an NHC. The first and second navigation algorithms are executed simultaneously.

In step 440, a cradle rotation is detected with the second navigation algorithm. The second navigation algorithm result produced from the inertial sensor data generated during the cradle rotation can be output, such as to the screen 230.

In step 450, a first navigation algorithm result produced from the inertial sensor data generated during the cradle rotation is discarded.

In step 460, the first algorithm is computationally (i.e., mathematically) realigned, based on the second navigation algorithm result produced from the inertial sensor data generated during the cradle rotation. The realigning can include realigning the first algorithm in one step after the cradle rotation is completed.

In another exemplary embodiment, provided is a method for detecting cradle rotation. First, a unit vector $\hat{f}$ is determined. The unit vector $\hat{f}$ represents a vehicle's forward axis in the Inertial Measurement Unit (IMU) frame. A relationship between the vehicle's velocity expressed in the vehicle body coordinate frame and the same velocity expressed in the IMU coordinate frame is:

$$v^{vehicle} = R_{IMU}^{vehicle} v^{IMU} \quad \text{(Equation 1)}$$

$$\begin{bmatrix} v_R \\ v_F \\ v_U \end{bmatrix}^{vehicle} = \begin{bmatrix} R_{11} & R_{12} & R_{13} \\ R_{21} & R_{22} & R_{23} \\ R_{31} & R_{32} & R_{33} \end{bmatrix}_{IMU}^{vehicle} \cdot \begin{bmatrix} v_x \\ v_y \\ v_z \end{bmatrix}^{IMU} \quad \text{(Equation 2)}$$

According to the non-holonomic constraint, two of the velocity components are zero in the vehicle's right-forward-up (RFU) body frame, i.e. $v_R = v_U = 0$. Also, assuming the vehicle is moving in a forward direction, $v_F = \|v^{IMU}\| > 0$, so:

$$\begin{bmatrix} 0 \\ \|\vec{v}^{IMU}\| \\ 0 \end{bmatrix}^{vehicle} = \begin{bmatrix} R_{11} & R_{12} & R_{13} \\ R_{21} & R_{22} & R_{23} \\ R_{31} & R_{32} & R_{33} \end{bmatrix}_{IMU}^{vehicle} \cdot \begin{bmatrix} v_x \\ v_y \\ v_z \end{bmatrix}^{IMU} \quad \text{(Equation 3)}$$

This gives the following system of equations:

$$0 = R_{11}v_x + R_{12}v_y + R_{13}v_z \quad \text{(Equation 4)}$$

$$\|v^{IMU}\| = R_{21}v_x + R_{22}v_y + R_{23}v_z \quad \text{(Equation 5)}$$

$$0 = R_{31}v_x + R_{32}v_y + R_{33}v_z \quad \text{(Equation 6)}$$

Equations (4) and (6) give no information, however, equation (5) can be used to compute estimates of $R_{21}$, $R_{22}$, $R_{23}$ using linear regression. Because of the assumption that $v_F = \|v^{IMU}\| > 0$, all data points used in the linear regression estimate must come from instances when it is known that the vehicle is travelling in the forward direction (as opposed to a backward direction). It is reasonable to assume that nobody drives in reverse at speeds greater than 6.0 m/s, thus all data points used in the linear regression must satisfy $\|v^{IMU}\| > 6.0$ m/s. The limit of 6.0 m/s was determined after a literature search.

A linear regression to solve for $R_{21}$, $R_{22}$, $R_{23}$ can be formulated as follows:

$$Y = V \begin{bmatrix} R_{21} \\ R_{22} \\ R_{23} \end{bmatrix} \quad \text{(Equation 7)}$$

$$\begin{bmatrix} \|v_1^{IMU}\| \\ \|v_2^{IMU}\| \\ \vdots \\ \|v_n^{IMU}\| \end{bmatrix} = \begin{bmatrix} v_{x_1} & v_{y_1} & v_{z_1} \\ v_{x_2} & v_{y_2} & v_{z_2} \\ \vdots & \vdots & \vdots \\ v_{x_n} & v_{y_n} & v_{z_n} \end{bmatrix} \cdot \begin{bmatrix} R_{21} \\ R_{22} \\ R_{23} \end{bmatrix} \quad \text{(Equation 8)}$$

$$f = \begin{bmatrix} r_{21} \\ r_{22} \\ r_{23} \end{bmatrix} = (V^T V)^{-1} V^T Y \quad \text{(Equation 9)}$$

The vector f is a vector in the IMU co-ordinate frame which represents the vehicle's forward axis. Because the vector f is estimated using linear regression, which in effect estimates the average forward unit vector in a least squares sense, it is likely that $|f| \neq 1$, and therefore it is necessary to normalize the vector f to compute a final estimate of the unit vector, $\hat{f}$:

$$\hat{f} = \begin{bmatrix} f_1 \\ f_2 \\ f_3 \end{bmatrix} = \frac{f}{|f|} == \begin{bmatrix} \frac{r_{21}}{|f|} \\ \frac{r_{22}}{|f|} \\ \frac{r_{23}}{|f|} \end{bmatrix} \quad \text{(Equation 10)}$$

Second, the down direction is computed. An assumption is that, on average, the measured accelerations are largely composed of gravity, while the forward and lateral acceleration components are averaged out. This assumption is not valid on turns and slanted roads, and data relating to these situations should be excluded. An average direction $\hat{d}$ of the measured accelerations, given in the IMU coordinate system, points opposite to gravity. The average direction $\hat{d}$ is an average direction in a least squares sense and computed similarly to the unit vector $\hat{f}$:

$$\begin{bmatrix} \|a_1^{IMU}\| \\ \|a_2^{IMU}\| \\ \vdots \\ \|a_n^{IMU}\| \end{bmatrix} = \begin{bmatrix} a_{x_1} & a_{y_1} & a_{z_1} \\ a_{x_2} & a_{y_2} & a_{z_2} \\ \vdots & \vdots & \vdots \\ a_{x_n} & a_{y_n} & a_{z_n} \end{bmatrix} \begin{bmatrix} d_1 \\ d_2 \\ d_3 \end{bmatrix} \quad \text{(Equation 11)}$$

$$Y_d = A \begin{bmatrix} d_1 \\ d_2 \\ d_3 \end{bmatrix} \quad \text{(Equation 12)}$$

where $\alpha_{x_k}$ is the x component of the measured acceleration at epoch k, etc. and $$\hat{d} = \begin{bmatrix} d_1 \\ d_2 \\ d_3 \end{bmatrix} = (A^T A)^{-1} A^T Y_d \quad \text{(Equation 13)}$$

Then the right pointing unit vector $\hat{r}$ expressed in the IMU frame is:

$$\hat{r} = \begin{bmatrix} r_1 \\ r_2 \\ r_3 \end{bmatrix} = \frac{\hat{f} \times \hat{d}}{\|\hat{f} \times \hat{d}\|} \quad \text{(Equation 14)}$$

Equation (14) assumes that $\hat{f}$ and $\hat{d}$ are not parallel, which is virtually always true for a terrestrial vehicle, but for other applications such as pedestrian navigation it may not be, and thus the expression may become singular.

The upward pointing unit vector $\hat{u}$ completes the right handed coordinate system:

$$\hat{u} = \begin{bmatrix} u_1 \\ u_2 \\ u_3 \end{bmatrix} = \hat{r} \times \hat{f} \quad \text{(Equation 15)}$$

The $(\hat{r}, \hat{f}, \hat{u})$ coordinate system is the vehicle coordinate system for NHC purposes:

$$\begin{bmatrix} v_x \\ v_y \\ v_z \end{bmatrix}^{vehicle} = \begin{bmatrix} n_1 & n_2 & n_3 \\ f_1 & f_2 & f_3 \\ u_1 & u_2 & u_3 \end{bmatrix}_{IMU}^{vehicle} \cdot \begin{bmatrix} v_x \\ v_y \\ v_z \end{bmatrix}^{IMU} = R_{IMU}^{vehicle} \cdot \begin{bmatrix} v_x \\ v_y \\ v_z \end{bmatrix}^{IMU} \quad \text{(Equation 16)}$$

It can be proven, from the way $\hat{u}$ was defined, that $R_{IMU}^{vehicle}$ is a rotation matrix:

$$R_{IMU}^{vehicle} = \begin{bmatrix} n_1 & n_2 & n_3 \\ f_1 & f_2 & f_3 \\ u_1 & u_2 & u_3 \end{bmatrix}_{IMU}^{vehicle} \quad \text{(Equation 17)}$$

When this rotation is significantly different enough from the rotation in the previous computation cycle, a cradle rotation is detected.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

In some aspects, the teachings herein can be employed in communication device and/or a multiple-access system capable of supporting communication with multiple users by sharing the available system resources (e.g., by specifying one or more of bandwidth, transmit power, coding, interleaving, and so on). For example, the communication device and/or the multiple-access system can be compatible with any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication device employing the teachings herein can be designed to implement one or more standards, such as IS-95, cdma2000, IS-856, W-CDMA, TDSCDMA, and other standards. A CDMA network can implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein can be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure can be described using 3GPP terminology, it is to be understood that the teachings herein can be applied to 3GPP (e.g., Re199, Re15, Re16, Re17) technology, as well as 3GPP2 (e.g., 1xRTT, 1xEV-DO Re1O, RevA, RevB) technology and other technologies. The techniques can be used in emerging and future networks and interfaces, including Long Term Evolution (LTE).

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

An embodiment of the invention can include a computer readable media embodying a method described herein. Accordingly, the invention is not limited to illustrated examples and any means for performing the functionality described herein are included in embodiments of the invention.

The disclosed devices and methods can be designed and can be configured into GDSII and GERBER computer files, stored on a computer readable media. These files are in turn provided to fabrication handlers who fabricate devices, based on these files, with a lithographic device. The resulting products are semiconductor wafers that are then cut into semiconductor die and packaged into a semiconductor chip. The chips are then employed in devices described herein.

Nothing that has been stated or illustrated is intended to cause a dedication of any component, step, feature, object, benefit, advantage, or equivalent to the public, regardless of whether it is recited in the claims.

While this disclosure shows exemplary embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order.

What is claimed is:

1. A method for mitigating an inertial navigation error, comprising:
    receiving inertial sensor data;
    processing the inertial sensor data with a first navigation algorithm having a non-holonomic constraint (NHC);
    processing the inertial sensor data with a second navigation algorithm lacking a NHC,
    wherein the first and second navigation algorithms are executed simultaneously;
    detecting a cradle rotation with the second navigation algorithm; and
    discarding a first navigation algorithm result produced from the inertial sensor data generated during the cradle rotation.

2. The method of claim 1, further comprising outputting a second navigation algorithm result produced from the inertial sensor data generated during the cradle rotation.

3. The method of claim 1, further comprising computationally realigning the first algorithm based on a second navigation algorithm result produced from the inertial sensor data generated during the cradle rotation.

4. The method of claim 3, wherein the realigning includes realigning the first algorithm in one step after the cradle rotation is completed.

5. The method of claim 1, wherein the inertial sensor data is gyroscope output data.

6. The method of claim 1, wherein the inertial sensor data is accelerometer output data.

7. An apparatus configured to mitigate an inertial navigation error, comprising:
    means for receiving inertial sensor data;
    means for processing the inertial sensor data with a first navigation algorithm having a non-holonomic constraint (NHC);
    means for processing the inertial sensor data with a second navigation algorithm lacking a NHC,
    wherein the first and second navigation algorithms are executed simultaneously;
    means for detecting a cradle rotation with the second navigation algorithm; and
    means for discarding a first navigation algorithm result produced from the inertial sensor data generated during the cradle rotation.

8. The apparatus of claim 7, further comprising means for outputting a second navigation algorithm result produced from the inertial sensor data generated during the cradle rotation.

9. The apparatus of claim 7, further comprising means for computationally realigning the first algorithm based on a second navigation algorithm result produced from the inertial sensor data generated during the cradle rotation.

10. The apparatus of claim 9, wherein the means for computationally realigning includes means for realigning the first algorithm in one step after the cradle rotation is completed.

11. The apparatus of claim 7, wherein the inertial sensor data is gyroscope output data.

12. The apparatus of claim 7, wherein the inertial sensor data is accelerometer output data.

13. The apparatus of claim 7, wherein at least a part of the apparatus is integrated on a semiconductor die.

14. The apparatus of claim 7, further comprising at least one of a mobile device, a navigation device, communications device, personal digital assistant (PDA), and a computer, into which the apparatus is integrated.

15. An apparatus configured to mitigate an inertial navigation error, comprising a processor configured to:
   receive inertial sensor data;
   process the inertial sensor data with a first navigation algorithm having a non-holonomic constraint (NHC);
   process the inertial sensor data with a second navigation algorithm lacking a NHC,
   wherein the first and second navigation algorithms are executed simultaneously;
   detect a cradle rotation with the second navigation algorithm; and
   discard a first navigation algorithm result produced from the inertial sensor data generated during the cradle rotation.

16. The apparatus of claim 15, wherein the processor is further configured to output a second navigation algorithm result produced from the inertial sensor data generated during the cradle rotation.

17. The apparatus of claim 15, wherein the processor is further configured to computationally realign the first algorithm based on a second navigation algorithm result produced from the inertial sensor data generated during the cradle rotation.

18. The apparatus of claim 17, wherein the processor is further configured to computationally realign the first algorithm in one step after the cradle rotation is completed.

19. The apparatus of claim 15, wherein the inertial sensor data is gyroscope output data.

20. The apparatus of claim 15, wherein the inertial sensor data is accelerometer output data.

21. The apparatus of claim 15, wherein at least a part of the processor is integrated on a semiconductor die.

22. The apparatus of claim 15, further comprising at least one of a mobile device, a navigation device, communications device, personal digital assistant (PDA), and a computer, with which the processor is integrated.

23. A non-transitory computer-readable medium, comprising instructions stored thereon that, if executed by a processor, cause the processor to execute a method comprising:
   receiving inertial sensor data;
   processing the inertial sensor data with a first navigation algorithm having a non-holonomic constraint (NHC);
   processing the inertial sensor data with a second navigation algorithm lacking a NHC,
   wherein the first and second navigation algorithms are executed simultaneously;
   detecting a cradle rotation with the second navigation algorithm; and
   discarding a first navigation algorithm result produced from the inertial sensor data generated during the cradle rotation.

24. The non-transitory computer-readable medium of claim 23, wherein the method further comprises outputting a second navigation algorithm result produced from the inertial sensor data generated during the cradle rotation.

25. The non-transitory computer-readable medium of claim 23, wherein the method further comprises computationally realigning the first algorithm based on a second navigation algorithm result produced from the inertial sensor data generated during the cradle rotation.

26. The non-transitory computer-readable medium of claim 25, wherein the computational realigning includes realigning the first algorithm in one step after the cradle rotation is completed.

27. The non-transitory computer-readable medium of claim 23, wherein the inertial sensor data is gyroscope output data.

28. The non-transitory computer-readable medium of claim 23, wherein the inertial sensor data is accelerometer output data.

29. The non-transitory computer-readable medium of claim 23, wherein the non-transitory computer-readable medium is integrated with at least one of a mobile device, a navigation device, communications device, personal digital assistant (PDA), and a computer.

* * * * *